(12) United States Patent
Sato et al.

(10) Patent No.: US 6,258,515 B1
(45) Date of Patent: Jul. 10, 2001

(54) PATTERN FORMING METHOD

(75) Inventors: Toshihiko Sato; Masaharu Yokoyama; Osamu Suzaki, all of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/293,534

(22) Filed: Apr. 15, 1999

(30) Foreign Application Priority Data

Apr. 23, 1998 (JP) .................................................. 10-113516

(51) Int. Cl.[7] ...................................................... G03F 7/26
(52) U.S. Cl. .......................................... 430/320; 430/322
(58) Field of Search ............................ 360/103; 430/323, 430/329, 330, 320, 322

(56) References Cited

U.S. PATENT DOCUMENTS

| | | | |
|---|---|---|---|
| 4,375,390 | 3/1983 | Anderson et al. ...................... 204/15 |
| 4,778,747 | * 10/1988 | Ohta et al. ............................. 430/321 |
| 5,128,821 | 7/1992 | Takeuchi et al. ...................... 360/103 |
| 5,251,083 | 10/1993 | Takeuchi et al. ...................... 360/103 |
| 5,329,689 | 7/1994 | Azuma et al. ........................... 29/603 |
| 5,799,388 | 9/1998 | Shouji ................................. 29/603.09 |
| 5,897,984 | * 4/1999 | Kubota et al. ......................... 430/320 |
| 6,081,991 | * 7/2000 | Tsunoda et al. .................... 29/603.12 |
| 6,094,805 | * 8/2000 | Iijima et al. ....................... 29/603.12 |
| 6,129,855 | * 10/2000 | Sawada et al. .......................... 216/22 |

* cited by examiner

Primary Examiner—Kathleen Duda
(74) Attorney, Agent, or Firm—Brinks Hofer Gilson & Lione (57) ABSTRACT

Since each interval between slider bars 6 is filled with a resist film 12, the surface of each slider bar 6 is made flat. Consequently, the surface of the resist film 13 bonded to the surface of each slider bar can be easily made flat, whereby the etching patterns of ABS planes can be formed on the surface of the resist film 13 with a good dimensional accuracy.

4 Claims, 7 Drawing Sheets

PATTERN FORMING METHOD

BACKGROUND OF THE INVENTION

1. Field of the Invention

The present invention pertains to a pattern forming method for bonding a resist film to, for example, the surface of a slider bar, which opposes a recording medium, and for forming the etching patterns of ABS planes on the resist film by exposing and developing the etching patterns to the resist film. More particularly, the present invention relates to a pattern forming method capable of forming etching patterns with a good dimensional accuracy.

2. Description of the Related Art

In a magnetic head device mounted on a hard disc apparatus, a slider is mounted at the extreme end of a gimbal formed of a leaf spring material. A thin film element having a recording and reproducing function is formed on an end of the slider.

Figure 15:
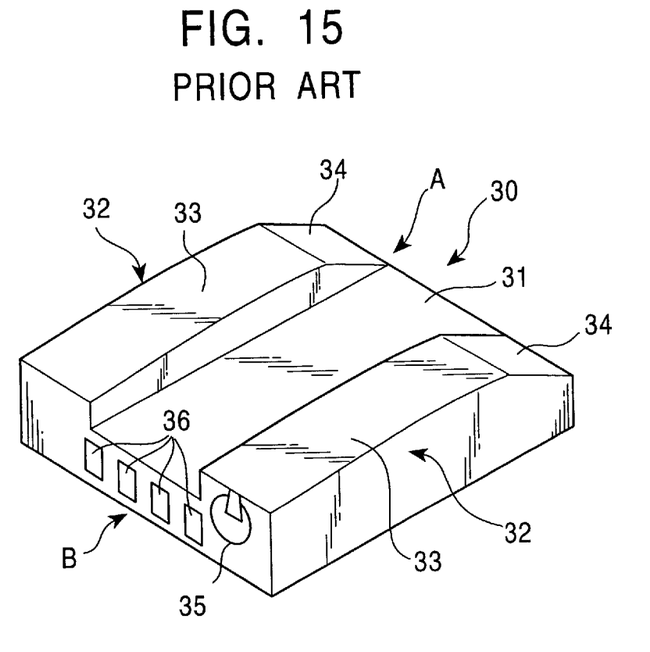
FIG. 15 is a perspective view showing a slider with its surface, which opposes a recording medium, facing upward.

FIG. 15 is a perspective view showing the slider with its surface, which opposes a recording medium, facing upward.

Referring to FIG. 15, a slider 30 is formed of a ceramic material such as alumina-titanium carbide, silicon (Si) or the like. An air groove 31 is formed on the surface of the slider 30 which opposes a hard disc as a recording medium, and rail portions 32, 32 are formed on both the sides of the air groove 31.

As shown in FIG. 15, the rail portions 32, 32 are formed to a prescribed crown shape, and the surfaces of the rail portions 32, 32 are arranged as ABS planes (floating planes) 33, 33. Further, inclining portions 34, 34 are formed on the end portions A of the rail portions 32, 32 on the leading sides thereof.

A thin film element 35 is disposed to the end face (end portion) of the slider 30 on the trailing side B thereof.

The thin film element 35 is composed of a reproducing MR head and a recording inductive head which are laminated on each other. The reproducing MR head has a magnetoresistive effect element layer such as an anisotropic magnetoresistive (AMR) element, a spin valve type thin film element and the like, and the recording inductive head is formed of a core and a coil each composed of a magnetic material.

As shown in FIG. 15, a plurality of terminal electrode portions 36, which are drawn from the thin film element 35, are formed on the end face B of the slider 30 on the trailing side thereof.

To make the slider 30, first, a ceramic material serving as the base material of the slider 30 is formed to a disc shape, and a plurality of thin film elements are sputtered on the ceramic material in parallel with each other.

Then, the ceramic material is sliced and a plurality of slender slider bars are formed from the ceramic material.

Figure 16:
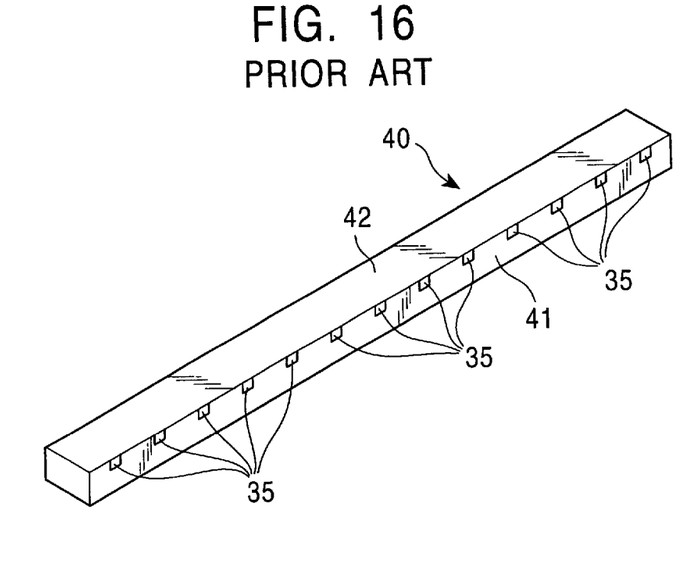
FIG. 16 is a perspective view of a slider bar.

FIG. 16 is a perspective view showing one of the slider bars 40.

As shown in FIG. 16, a plurality of the thin film elements 35 are formed on a side 41 (end face on the trailing side) of the slider bar 40.

Numeral 42 shown in FIG. 16 is the opposing surface of the slider bar 40 which opposes the recording medium, and a plurality of the ABS planes 33, 33, which are shown in FIG. 15 and which are as many as the thin film elements 35, are formed on the opposing surface 42 through exposure and development.

How the etching patterns of the ABS planes were conventionally formed will be described with reference to FIG. 17.

Figure 17:
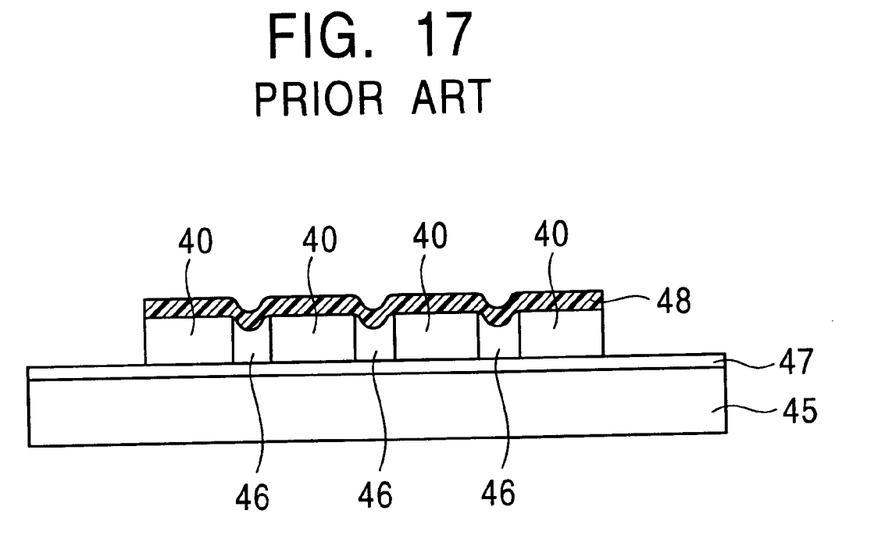
FIG. 17 is a process view showing a conventional etching pattern forming method for forming the etching pattern of each ABS plane.

First, as shown in FIG. 17, a plurality of the slider bars 40 (refer to FIG. 16) are disposed on a flat jig 45 with the opposing surfaces 42 thereof, which oppose the recording medium, facing upward.

At the time, the respective slider bars 40 are disposed at prescribed intervals 46 to prevent the thin film elements 35, which are formed on the sides of the slider bars 40 as shown in FIG. 16, from being damaged.

As shown in FIG. 17, the slider bars 40 are fixed on the jig 45 through an adhesive 47.

Next, a photosensitive resist film 48 is bonded to the surface of each slider bar 40.

Although the resist is also available in a liquid state in addition to the film state, the cost of the resist film is lower than that of a resist solution. Further, when the resist solution is used, it must be heated to remove the solvent contained in the resist solution after the surface of each slider bar 40 is coated with the resist solution. The use of the resist film is advantageous because the heating process is not necessary as well as the number of processes can be reduced.

When the etching pattern of each ABS plane is exposed on the surface of the photosensitive resist film 48 through a not shown exposure mask and further the etching pattern is processed in a developing process and a dry etching process, a plurality of the ABS planes 33, 33 are formed on the opposing surface 42 of each of the slider bars 40 as shown in FIG. 15.

A plurality of the sliders 30, which are shown in FIG. 15, can be obtained from the single slider bar 40 by cutting off the slider bar 40, which has a plurality of the ABS planes 33, 33 formed on the opposing surface 42 thereof, between the thin film elements 35.

SUMMARY OF THE INVENTION

However, the conventional method for forming the etching pattern of the ABS plane has the following problems.

As shown in FIG. 17, a plurality of the slider bars 40 are disposed on the jig 45 and the resist film 48 is bonded to the surface of each slider bar 40. At the time, since the resist film 48, which is bonded to the intervals 46 between the slider bars 40, is bent, the surface of the photosensitive resist film 48 is not made flat.

Another factor, which prevents the surface of the photosensitive resist film 48 from being formed flatly, is the pre-formation of the inclining portions 34, 34, which are shown in FIG. 15, on the opposing surface 42 of the slider bar 40 in the state of the slider bar 40 shown in FIG. 16. A still another factor resides in that the opposing surface 42 of the slider bars 40 are previously formed to the crown shape.

When the etching patterns of the ABS planes are exposed to the surface of the resist film 48 in the state in which the surface of the resist film 48 is not made flat, distortion arises to the etching patterns. There is caused a problem thereby that the ABS planes 33 cannot be formed with a good dimensional accuracy (refer to FIG. 1.).

After the etching patterns are formed, dry etching is carried out to the slider bars 40 using the etching patterns. However, since the sides of each of the slider bars 40 are exposed, the sides are etched with the dry etching and etched ceramic powder deposits again on the sides of another slider bar 40 adjacent to the above slider bar 40.

In addition, since the thin film elements 35 (refer to FIG. 16) are formed on the side of each of the slider bars 40, the thin film elements 35 may be damaged with the dry etching.

Accordingly, an object of the present invention, which was made to solve the above problems, is to provide a pattern forming method by which etching patterns can be formed with a particularly good dimensional accuracy, and which can prevent the redeposition of substrate powder in a dry etching process and the damage of thin film elements.

A pattern forming method of a first embodiment of the present invention is characterized by comprising the step of disposing a plurality of slider bars, each having a plurality of elements on a side thereof, on a jig side by side; the preliminary step of bonding a resist film to the surface of each slider bar or coating the surface of each slider bar with a resist solution and filling each interval between the slider bars with the resist film or the resist solution; the step of removing the resist film or the resist solution on each slider bar with a developer and causing the resist film or the resist solution, with which each interval between the slider bars is filled, to remain as it is; the step of bonding a resist film to the surface of each slider bar; the step of exposing and developing the surface of the resist film and forming the etching patterns of ABS planes on the resist film; and the step of applying dry etching to the surface of each slider bar using the etching patterns.

It is preferable that heat is applied, at the preliminary step, to the resist film on the surface of each slider bar to fill each interval between the slider bars with the resist film.

A pattern forming method of a second embodiment of the present invention is characterized by comprising the step of disposing a plurality of slider bars, each having a plurality of elements on a side thereof, on a jig side by side; the step of bonding a resist film to the surface of each slider bar; the step of heating and pressing the resist film on the surface of each slider bar to thereby fill each interval between the slider bars with the resist film; the step of exposing and developing the resist film on the surface of each slider bar and forming the etching patterns of ABS planes on the resist film; and the step of applying dry etching to the surface of each slider bar using the etching patterns.

In the present invention, it is preferable that the thickness of the resist film bonded to the surface of each slider bar is greater than the thickness which is necessary to form the etching patterns of the ABS planes.

A pattern forming method of a third embodiment of the present invention is characterized by comprising the step of forming a plurality of elements on a substrate and further forming a resist layer covering the elements; the step of forming a plurality of slider bars by cutting off the substrate; the step of disposing a plurality of the slider bars on a jig with the sides thereof, on which the elements are formed, opposing between the slider bars; the step of bonding a resist film to the surface of each of the slider bars disposed side by side; the step of exposing and developing the surface of the resist film and forming the etching patterns of ABS planes on the surface of the resist film; and the step of applying dry etching to the surface of each slider bar using the etching patterns.

In the present invention, any of the resist film and the resist solution may be used in the resist layer.

In the present invention, it is preferable that the resist layer is not formed on the electrode terminal portions which are drawn from the elements and formed on the same surface as the surface where the elements are formed.

The present invention is made to form the etching pattern of each ABS plane (floating plane) on, for example, the surface of a slider bar which opposes a recording medium with a good dimensional accuracy and to prevent a side of the slider bar from being damaged when dry etching is applied to the slider bar using the etching patterns.

First, to form the etching patterns with the good dimensional accuracy, the surface of the resist film bonded to the slider bar must be made flat.

To prevent the damage of the sides of the slider bar in the dry etching process, it is sufficient for a resist to penetrate each interval between the slider bars, which are fixed on a jig, and to protect the sides of the slider bars with the resist.

The steps for forming the etching pattern of each ABS plane of the present invention are shown in FIG. 3 to FIG. 5, FIG. 6 to FIG. 8, FIG. 9 to FIG. 11, and FIG. 12 to FIG. 14.

With the methods of forming the etching pattern of each ABS plane shown in FIG. 3 to FIG. 5 and FIG. 6 to FIG. 8, a resist film 12 is heated and bonded to the surface of each of a plurality of slider bars 6 fixed on a jig 9 or the surface of each of a plurality of the slider bars 6 is coated with a resist solution 14. The film 12 or the resist solution 14 thereby penetrates each interval 11 between the slider bars 6.

Thereafter, the resist film 12 or the resist solution 14 on the slider bars 6 is removed with a developer. Then, a resist film 13 is bonded to the surface of each slider bar 6 again.

Figure 9:
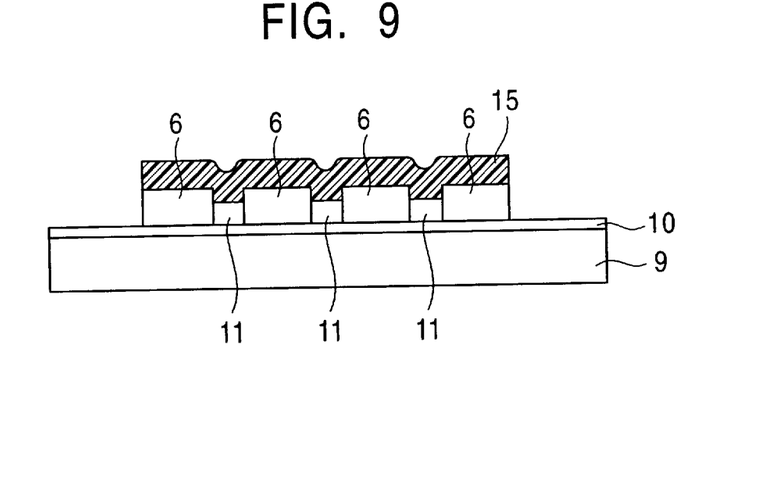
FIG. 9 is a process view showing the etching pattern forming method according to a third embodiment of the present invention for forming the etching pattern of each ABS plane.
Figure 10:
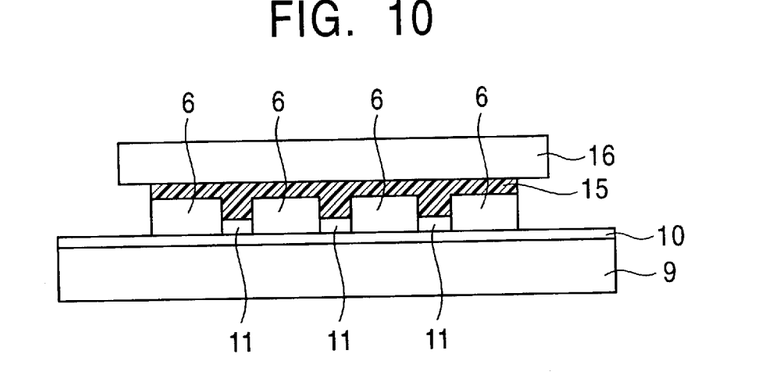
FIG. 10 is a process view showing a method for forming the etching patterns of the ABS plane which is carried out next to the process shown in FIG. 9.
Figure 11:
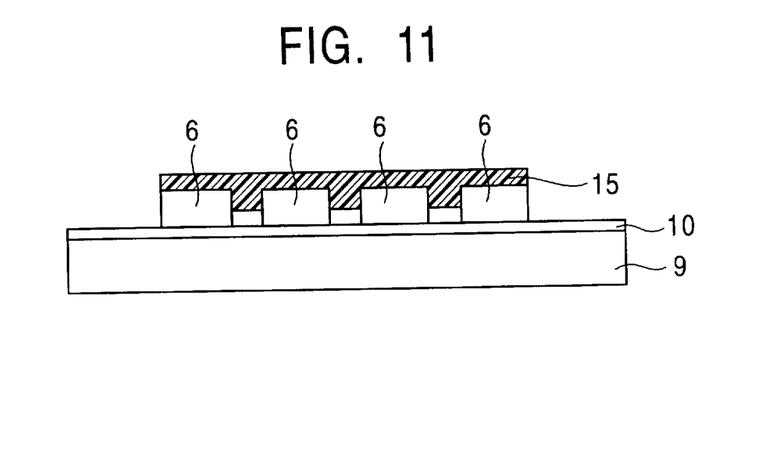
FIG. 11 is a process view showing a method for forming the etching patterns of the ABS plane which is carried out next to the process shown in FIG. 10.

With the method for forming the etching pattern of each ABS plane shown in FIG. 9 to FIG. 11, a resist film 15, whose thickness is greater than the thickness which is necessary to form etching patterns, is bonded to the surface of each of a plurality of the slider bars 6 fixed on the jig 9. The resist film 15 is heated and pressed so that the resist film 15 fills each interval 11 between the slider bars 6 as well as the surface of the resist film 15 is made flat.

Figure 12:
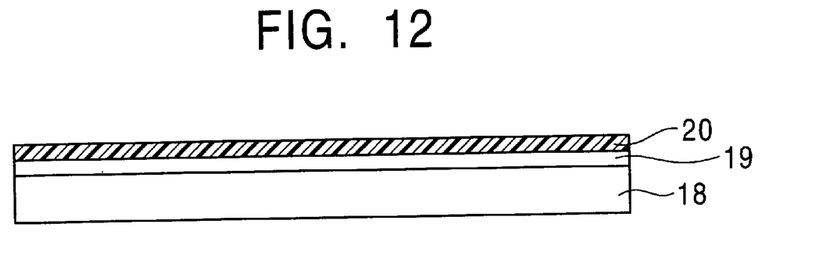
FIG. 12 is a process view showing an etching pattern forming method according to a fourth embodiment of the present invention for forming the etching pattern of each ABS plane.
Figure 13:
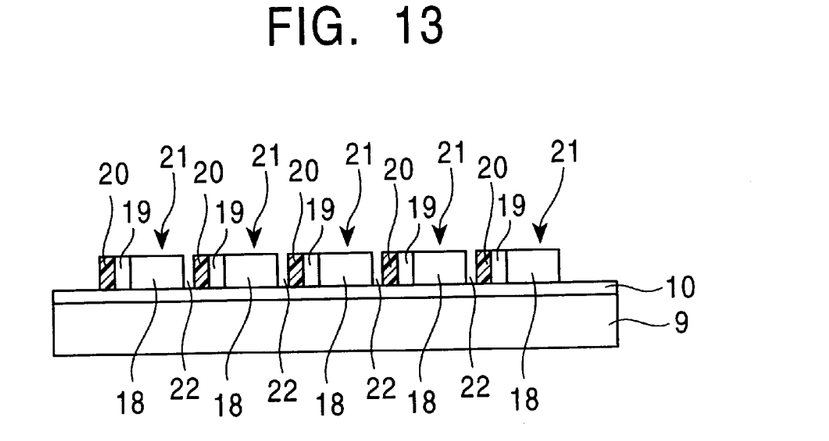
FIG. 13 is a process view showing a method for forming the etching patterns of the ABS plane which is carried out next to the process shown in FIG. 12.
Figure 14:
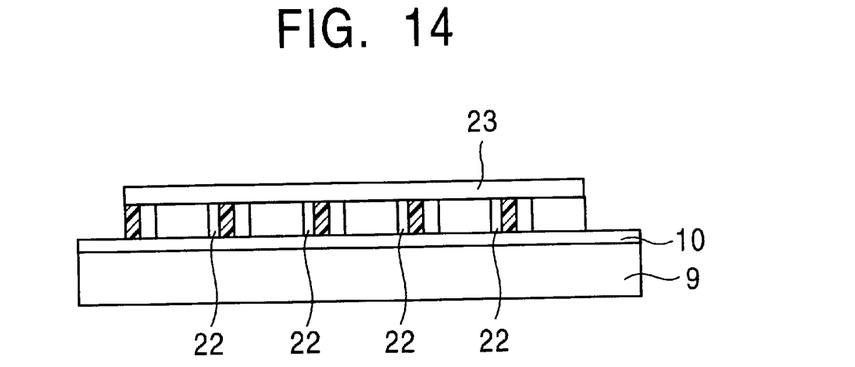
FIG. 14 is a process view showing a method for forming the etching patterns of the ABS plane which is carried out next to the process shown in FIG. 13.

With the method for forming the etching pattern of each ABS plane shown in FIG. 12 to FIG. 14, a resist layer 20 is formed on a ceramic material 18 formed on a disc shape, and the ceramic material 18 is cut off to slider bars 21.

When a plurality of the slider bars 21 are fixed on the jig 9, the intervals 22 between the slider bars 21 are narrowed, and a resist film 23 is bonded to the slider bars 21 in this state.

According to the present invention, with any of the methods, the resist film is bonded to the surface of each slider bar fixed on the jig, which have been made flat by filling each interval between the slider bars with the resist film or the resist solution. As a result, the surface of the resist film bonded to the surface of the slider bars is also made flat.

According to the present invention, since the etching pattern of each ABS plane can be formed on the surface of the resist film which has been made flat, the etching patterns can be formed with a good dimensional accuracy.

In the developing process, which is carried out to form the etching patterns to the resist film, the resist, which has penetrated each interval between the slider bars, is not removed with the developer.

Accordingly, in the present invention, the sides of the slider bars are not etched when the dry etching is carried out. Etched powder is thereby prevented from being redeposited on the sides of the slider bars by the dry etching.

Further, since each interval between the slider bars are filled with the resist, the thin film elements formed on sides of the slider bars are not damaged by the dry etching.

DESCRIPTION OF THE PREFERRED EMBODIMENTS

Figure 1:
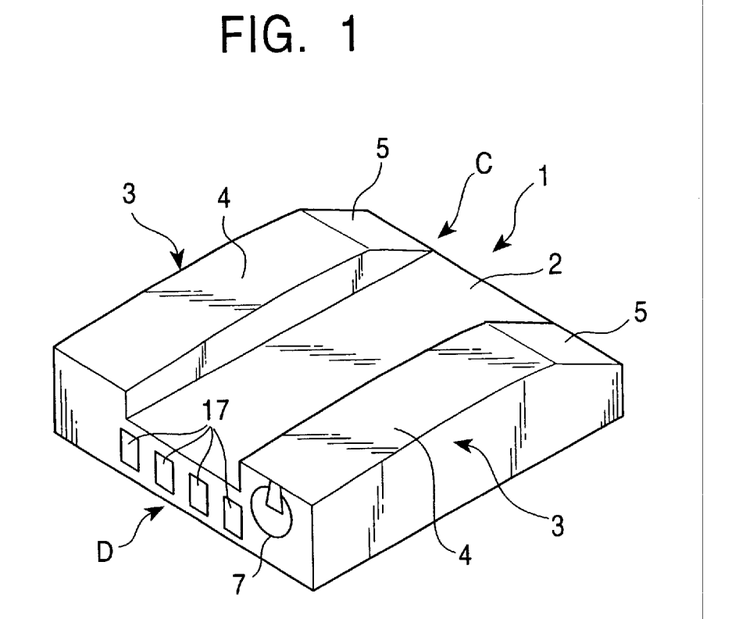
FIG. 1 is a perspective view showing a slider with its surface, which opposes a recording medium, facing upward.

FIG. 1 is a perspective view showing a slider of the present invention, which is to be mounted on a hard disc or the like, with its surface (ABS plane; floating plane), which opposes a recording medium, facing upward.

The slider 1 shown in FIG. 1 is formed of a ceramic material such as alumina-titanium carbide, silicon (Si) or the like.

As shown in FIG. 1, an air groove 2 is formed on the portion of the slider 1 which opposes a hard disc as a recording medium, and rail portions 3, 3 are formed on both the sides of the air groove 2.

As shown in FIG. 1, each of the rail portions 3, 3 is formed on a prescribed crown shape, and the surfaces of the rail portions 3, 3 are arranged as ABS planes (floating planes) 4, 4. Further, inclining portions 5, 5 are formed on the end portions C of the rail portions 3, 3 on the leading sides thereof.

A thin film element 7 is disposed to the end face (end portion) of the slider 1 on the trailing side D thereof.

The thin film element 7 is composed of a reproducing MR head and a recording inductive head which are laminated on each other. The reproducing MR head has a magnetoresistive effect element layer such as an anisotropic magnetoresistive (AMR) element, a spin valve type thin film element and the like, and the recording inductive head is formed of a core and a coil each composed of a magnetic material.

The magnetoresistive effect layer is composed of a giant magnetoresistive (GMR) element which is represented the AMR element and a spin bubble film. The magnetoresistive effect element layer captures the leakage magnetic field from a recording medium as a change of resistance and permits the change of resistance to be output as a change of voltage.

As shown in FIG. 1, the electrode terminal portions 17, which are drawn from the thin film element 7 and each of which is composed of a thin film, are formed on the end face D of the slider 1 on the trailing end thereof.

In the slider 1 shown in FIG. 1, a support member composed of a flexure or a load beam, which is formed of a leaf spring material, is attached to the lower surface of the slider 1, that is, to the surface thereof opposite to the ABS planes 4, 4. A conductive pattern is also formed on the flexure, and the conductive pattern is jointed to the electrode terminal portions 17 by the ball bonding of gold (Au), or the like.

A magnetic head device, on which the slider 1 shown in mounted, is operated by a CSS system or the like. The thin film element 7 records and reproduces information in the state in which the slider 1 floats over the recording medium by a prescribed amount.

To fabricate the slider 1 shown in FIG. 1, first, a ceramic material serving as the base material of the slider 1 is formed on a disc shape.

Figure 2:
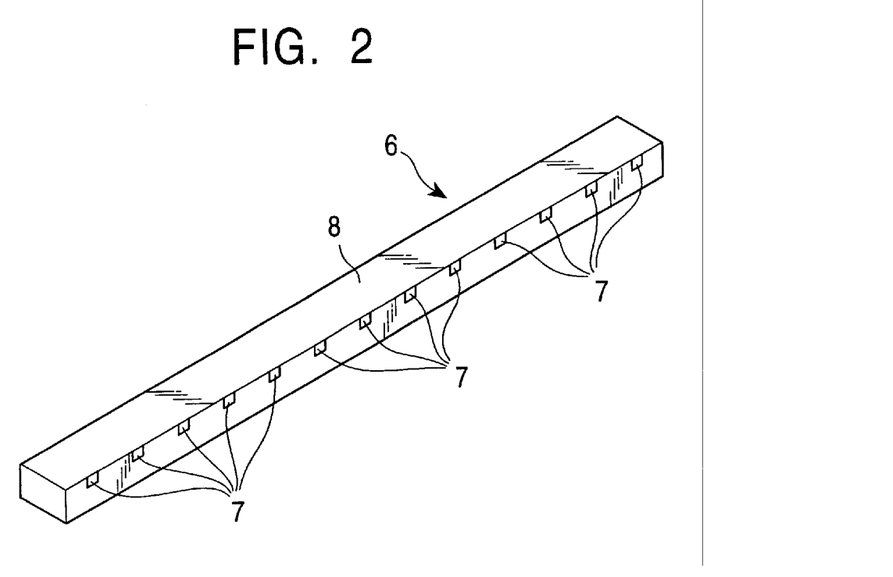
FIG. 2 is a perspective view of a slider bar.

Thereafter, a plurality of the thin film elements 7 are formed on the ceramic material in parallel with each other using patterns, and further the ceramic material is sliced. As a result, a plurality of slider bars 6, which are shown in FIG. 2, can be formed from the single disc-shaped ceramic material.

At the time, a plurality of the thin film elements 7 are formed on an end face of each slider bar 6.

Next, how the etching pattern of each ABS plane shown in FIG. 1 is formed on the surface 8 (the surface opposing the recording medium) of the slider bar 6 shown in FIG. 2 will be described.

Figure 3:
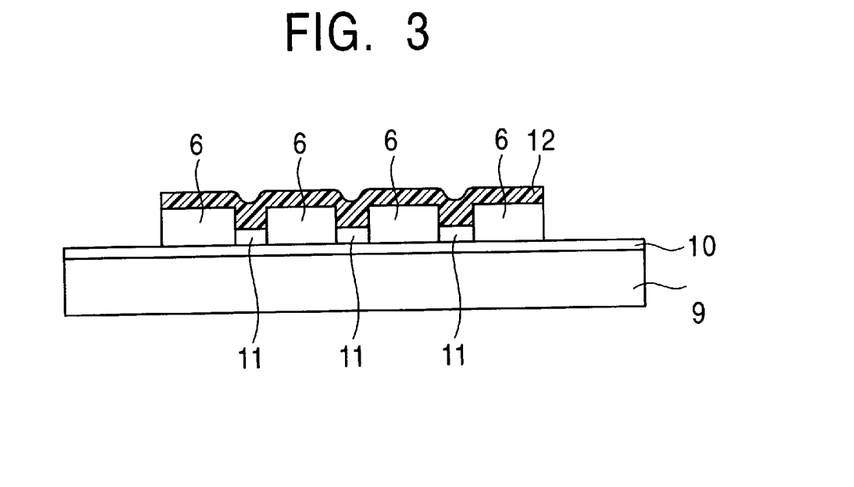
FIG. 3 is a process view showing an etching pattern forming method according to a first embodiment of the present invention for forming the etching pattern of each of ABS planes.

As shown in FIG. 3, a plurality of the slider bars 6 are fixed on a jig 9 through an adhesive 10.

At the time, prescribed intervals 11 are provide between the slider bars 6, as shown in FIG. 3.

The reason for providing the intervals is to prevent the thin film elements 7 (refer to FIG. 2), each of which has been formed on a side of each slider bar 6, from being damaged.

Then, a resist film 12 is bonded to the surface of each slider bar 6 as shown in FIG. 3.

The resist film 12 is arranged as a laminated film, and is composed of a cover film, which is bonded to the lower surface of a film-like resist, and/or a base film, which is bonded to the upper surface thereof. The resist film 12 is bonded to the slider bars 6 shown in FIG. 3 with a roller.

In the present invention, the resist film 12 is bonded to the slider bars 6 by the application of heat. More specifically, the slider bars 6 are preheated between 60° C. and 100° C., and the roller is heated between 100° C. and 140° C.

Since the resist film 12 is bonded by being heated, it is dissolved and penetrates each interval 11 between the slider bars 6.

As shown in FIG. 3, the surface of the resist film 12, which has penetrated each interval 11, is in a recessed state.

Figure 4:
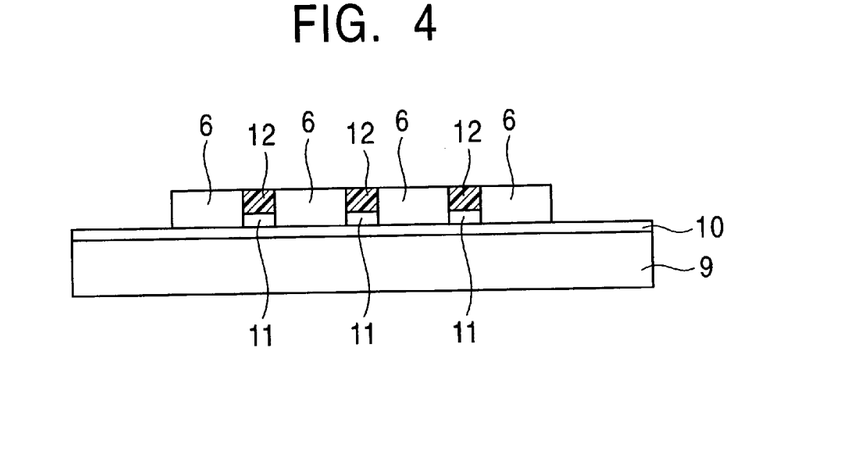
FIG. 4 is a process view showing a method for forming the etching pattern of each ABS plane which is carried out next to the process shown in FIG. 3.

In the present invention, next, the resist film 12 is removed with a developer.

As shown in FIG. 4, the resist film 12 on the slider bars 6 is removed with the developer. However, as shown in FIG. 4, the resist film 12, which has filled each interval 11 between the slider bars 6 and with which the developer is difficult to come into intimate contact, remains as it is.

Since the resist film 12 remains in each interval 11, the surface of each slider bar 6 is made flat.

Figure 5:
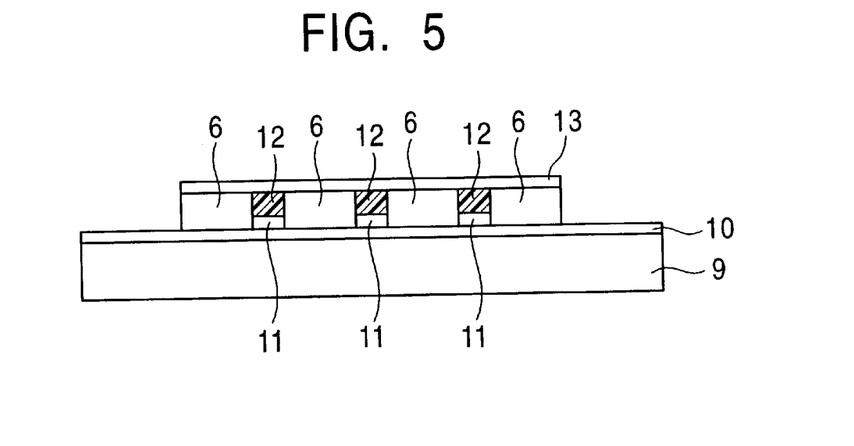
FIG. 5 is a process view showing a method for forming the etching pattern of each ABS plane which is carried out next to the process shown in FIG. 4.

Then, a resist film 13 is bonded to the surface of each slider bar 6 and to the surface of each of the resist films 12 which have filled the intervals 11, as shown in FIG. 5.

The resist film 13 is arranged as a laminated film similarly to the resist film 12 shown in FIG. 3, and is bonded to the surface of each slider bar 6 and to the surface of each of the resist films 12, with a roller.

The temperature at the time the resist film 13 is bonded is set lower than the temperature at the time the resist film 12 shown in FIG. 3 is bonded. The resist film 13 bonded to the surface of each slider bar 6 is hardened by ultraviolet rays, or the like.

In the present invention, the resist film 13 can be bonded to the surface of each slider bar 6 which has been made flat because the resist film 12 has filled each interval 11 between the slider bars 6. As a result, the surface of the thus bonded resist film 13 can be easily made flat.

Then, the surface of the resist film 13 is exposed and developed in the state shown in FIG. 5, and the etching pattern of each ABS plane is formed on the surface of the resist film 13.

In the developing process, only the resist film 13 as each etching pattern remains on the surface of each slider bar 6, and the resist film 13 other than the each etching pattern is removed from the surface of each slider bar 6. However, the resist film 12, which has penetrated each interval 11 between the slider bars 6 and with which the developer is difficult to come into intimate contact, remains as it is without being removed.

The surface of the resist film 13 has been made flat as described above. In the present invention, the etching pattern of each ABS plane can be thereby formed on the surface of the resist film 13 with a good dimensional accuracy.

Subsequently, a dry etching process is carried out using the resist film 13 which has been caused to remain on the slider bars 6 in the developing process.

When the dry etching is carried out, the resist film 12 remains in each interval 11 between the slider bars 6. Accordingly, the sides of the slider bars 6 are not etched by the dry etching, and the etched powder resulting from the dry etching does not deposit on the sides of, for example, an adjacent slider bar 6.

Moreover, since the resist film 12 has filled each interval 11 between the slider bars 6, the thin film elements 7 (refer to FIG. 2) formed on the sides of the slider bars 6 are also not affected by the dry etching. As a result, the thin film elements 7 can be prevented from being damaged by the dry etching.

Thereafter, the resist film 13, which has remained on each slider bar 6, and the resist film 12, which has remained in each interval 11 between the slider bars 6, are removed, and then the slider bars 6 are removed from the jig 9. Then, each slider bar 6 is cut off to the respective sliders 1 shown in FIG. 1.

As described above, in the present invention, the resist film 12 penetrates each interval 11 between a plurality of the slider bars 6 which have been fixed on the jig 9 (refer to FIG. 3). Only the resist film 12 on each slider bar 6 is removed once with the developer (refer to FIG. 4) and the surface of each slider bar 6 is made flat.

Since the resist film 13 is bonded again to the surface of each slider bar 6 (refer to FIG. 5), which has been made flat, the surface of the resist film 13 can be easily made flat.

Accordingly, in the present invention, the etching pattern of each ABS plane can be formed on the surface of the resist film 13 with the good dimensional accuracy.

Further, since the resist film 12, with which each interval 11 between the slider bars 6 has been filled, is not removed, the sides of each slider bar 6 are not etched by the dry etching.

Each interval 11 between the slider bars 6 is filled with the resist film 12 in the pattern forming method shown in FIG. 3 to FIG. 5. However, a resist solution may be used in place of the resist film 12.

Figure 6:
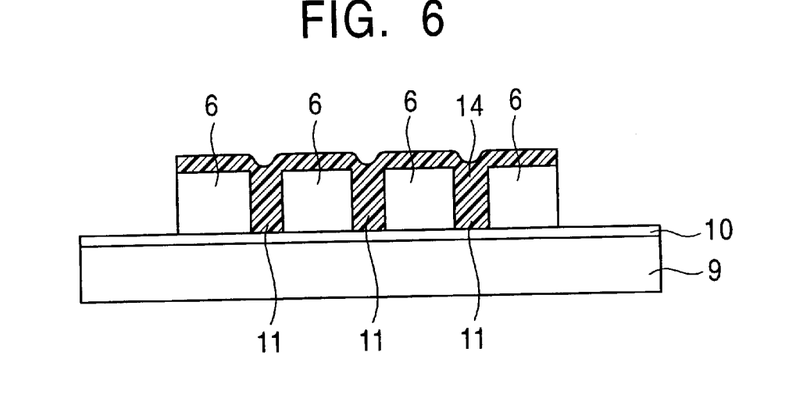
FIG. 6 is a process view showing the etching pattern forming method according to a second embodiment of the present invention for forming the etching pattern of each ABS plane.
Figure 7:
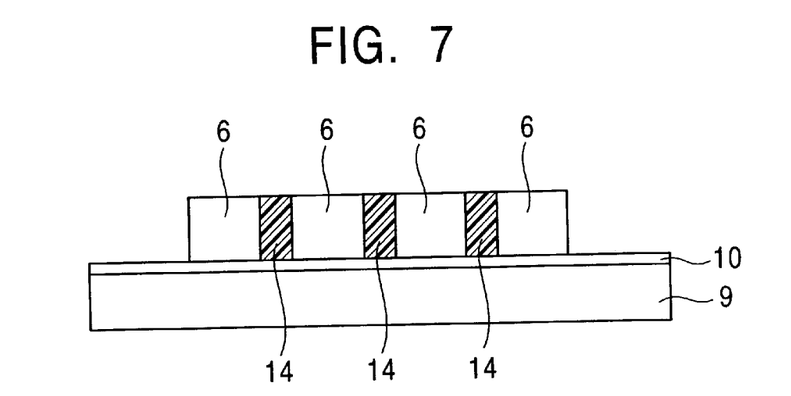
FIG. 7 is a process view showing a method for forming the etching patterns of the ABS plane which is carried out next to the process shown in FIG. 6.
Figure 8:
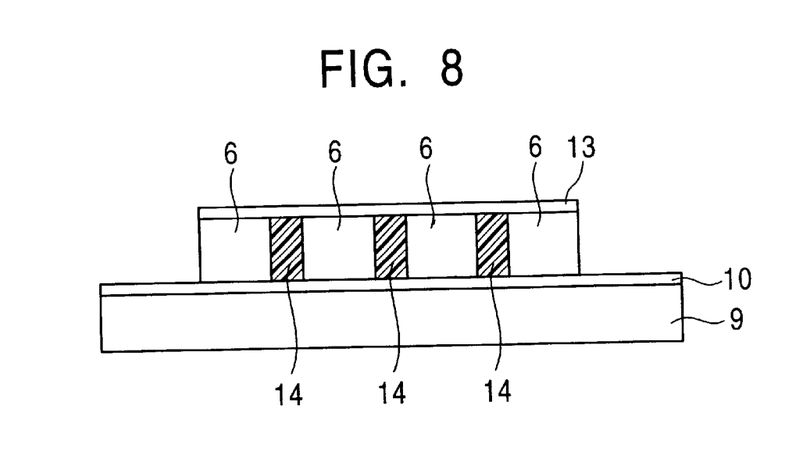
FIG. 8 is a process view showing a method for forming the etching patterns of the ABS plane which is carried out next to the process shown in FIG. 7.

A pattern forming method using the resist solution is shown in FIG. 6 to FIG. 8.

As shown in FIG. 6, the surface of each of a plurality of the slider bars 6, which have been fixed on the jig 9 through the adhesive 10, is coated with a resist solution 14.

At the time, the resist solution 14 also penetrates each interval 11 between the slider bars 6. The surface of the resist solution 14, which has penetrated each interval 11, is in a recessed state.

Next, the resist solution 14 is heated and hardened. Thereafter, the resist solution 14 is removed with a developer as shown in FIG. 7.

As shown in FIG. 7, only the resist solution 14 applied to the slider bars 6 is removed and the resist solution 14, which has penetrated each interval 11 between the slider bars 6 remains as it is.

As shown in FIG. 8, the resist film 13 is bonded to the surface of each slider bar 6 and to the surface of the resist solution 14, with which each interval 11 between the slider bars 6 has been filled. Thereafter, an exposing and developing process and a dry etching process are carried out.

As described above, according to the present invention, each interval 11 between the slider bars 6 is filled with the resist film 12 or the resist solution 14 (hereinafter, simply referred to as the resist). Then, the resist on each of the slider bars is removed with the developer once.

It is difficult, however, for the developer to come into intimate contact with the resist which has penetrated each interval 11 between the slider bars 6. As a result, the above resist is not removed and remains in each interval 11 between the slider bars 6.

The surface of each slider bar 6 is made flat by the resist which has remained in each interval 11 between the slider bars 6. In the present invention, the resist film 13 can be bonded to the surface of each slider bar 6, which has been made flat, so the surface of the resist film 13 can be easily made flat.

As a result, in the present invention, the etching pattern of each ABS plane can be easily formed on the surface of the resist film 13 with a good dimensional accuracy.

In the developing process which is carried out when the etching pattern is formed, the resist, with which each interval 11 between the slider bars 6 has been filled, is not removed. Thus, the sides of the slider bars 6 are not etched by the dry etching, so the redeposition of etched powder and the damage of the thin film elements 7 can be prevented.

FIG. 9 to FIG. 11 and FIG. 12 to FIG. 14 show other pattern forming methods of the present invention.

As shown in FIG. 9, a plurality of the slider bars 6 are bonded to and fixed on the jig 9 through the adhesive 10.

Then, a resist film 15 is bonded to the surface of each slider bar 6.

The resist film 15 is formed to have a thickness which is greater than the thickness which is ordinarily necessary to expose and develop an etching pattern.

As shown in FIG. 9, the surface of the resist film 15, which has been bonded to each interval 11, is in a recessed state.

In the present invention, it is preferable to bond the resist film 15 to the surface of each slider bar 6 while heating the resist film 15.

The resist film 15, which is being bonded to each interval 11 between the slider bars 6, is dissolved by being heated, so each interval 11 is filled with the resist film 15.

In the present invention, the resist film 15 is pressed with a heated plate 16, as shown in FIG. 10.

The lower surface of the plate 16 must be flat.

The resist film 15 is dissolved by being heated and pressed by the plate 16 and penetrates each interval 11 between the slider bars 6, and further the surface of each slider bar 6 is thereby made flat.

As shown in FIG. 11, when the plate 16 is removed, each interval 11 between the slider bars 6 is filled with the resist film 15. Th resist film 15 on each slider bar 6 has a prescribed thickness, and moreover the surface of the resist film 15 is made flat.

Next, the surface of the resist film 15, which has been made flat, is exposed and developed to thereby form the etching pattern of each ABS plane which is excellent in a dimensional accuracy.

In the developing process which is carried out when the etching patterns is formed, it is difficult to remove the resist, which has penetrated each interval 11 between the slider bars 6. Thus, the sides of each slider bar 6 are not etched by the dry etching, so the redeposition of etched powder on the sides of each slider bar and the damage of the thin film elements 7 (refer to FIG. 2) can be prevented.

In any of the etching pattern forming method shown in FIG. 3 to FIG. 5, the etching pattern forming method shown in FIG. 6 to FIG. 8, and the etching pattern forming method shown in FIG. 9 to FIG. 11, a plurality of the slider bars 6 are fixed on the jig 9. Thereafter, each interval 11 between the slider bars 6 is filled with the resist film or the resist solution. In the etching pattern forming method shown in FIG. 12 to FIG. 14, however, the intervals to be formed between the slider bars 6 can be previously made smaller when a plurality of the slider bars 6 are bonded to and fixed on the jig 9.

As described above, in order to form the slider 1 (refer to FIG. 1), first, a ceramic material 18 serving as the base material of the slider 1 is formed on a disc shape, then a plurality of the thin film elements are formed on the ceramic material.

Further, the electrode terminal portions 17, which are shown in FIG. 1 and have been drawn from the thin film elements 7, are also formed simultaneously with the formation of the thin film elements 7.

FIG. 12 is a sectional view showing the ceramic material 18 formed on the disc shape.

Numeral 19 shown in FIG. 12 denotes a thin film element forming layer on which the thin film elements, the layer for protecting the thin film elements, and the like are formed.

In the present invention, a resist layer 20, which serves as a protective layer for protecting the thin film elements, is further formed on the thin film element forming layer 19.

The protective resist layer 20 may be formed of a resist film or a resist solution.

The thin film elements, and the electrode terminal portions (denoted by numeral 17 in FIG. 1), which have been drawn from the thin film elements, are also formed on the thin film element forming layer 19. In the present invention, however, it is preferable not to form the protective resist layer 20 on the electrode terminal portions 17.

The electrode terminal portions 17 serve as "terminals" for supplying a current to the coils and the conductive layers formed in each thin film element 7. The electrode terminal portions 17 are connected to the conductive pattern, which has been formed on a support member for supporting the slider 1 shown in FIG. 1, through bonding pads.

If the protective resist layer 20 shown in FIG. 12 is formed on the electrode terminal portions 17 when it is formed on the thin film element forming layer 19, the electrode terminal portions 17 cannot be connected to the conductive pattern of the support member. Further, the capability of the thin film elements cannot be measured. Therefore, the protective resist layer 20 must not be formed on the electrode terminal portions 17.

Next, in the present invention, the ceramic material 18 shown in FIG. 12 is sliced to thereby form a plurality of slider bars 21.

As shown in FIG. 13, the slider bars 21 are bonded to and fixed on the jig 9 through the adhesive 10.

As shown in FIG. 13, since the thin film element forming layer 19 and the protective resist layer 20 are formed on a side of each slider bar 21, the thin film elements formed in the thin film element forming layer 19 can be sufficiently protected by the protective resist layer 20.

Therefore, as shown in FIG. 13, even if the slider bars 21 are disposed on the jig 9 in the state in which the intervals 22 between the slider bars 21 are sufficiently narrowed, the thin film elements formed on each slider bar 21 are not damaged.

Then, a resist film 23 is bonded to the surface of each slider bar 21 in the state shown in FIG. 13.

As described above, the intervals 22 between the slider bars 21 are very narrowed. Accordingly, even if the resist film 23 is bonded to each slider bar 21, the resist film 23, which has been bonded to each interval 22 is not flexed, so the surface of the resist film 23 can be easily made flat.

When the surface of the resist film 23, which has been made flat, is exposed and developed, the etching pattern of each ABS plane, which is excellent in a dimensional accuracy, can be formed.

When dry etching is carried out, since the sides of each slider bar 21 is protected by the protective resist layer 20, they are not etched by the dry etching. In addition, the thin film elements (thin film element forming layer 19) formed on the side of each slider bar 21 are not damaged by the dry etching.

As described above, in the first pattern forming method of the present invention, the pattern of each ABS plane 4 (refer to FIG. 1) is formed on the surface of the slider bar 6, which opposes the recording medium, in the following manner. That is, each interval 11 between the slider bars 6, which have been fixed on the jig 9, is filled with the resist film 12 (refer to FIG. 3) or the resist solution 14 (refer to FIG. 6), and the resist on each slider bar 6 is removed once with the developer.

In the development processing, however, since the developer does not come into intimate contact with the resist, which has penetrated each interval 11 between the slider bars 6, the above resist is not removed, so the surface of each slider bar 6 can be made flat by the development processing.

When the resist film 13 is bonded to the surface of each slider bar 6, which has been made flat, the surface of the resist film 13 can be easily made to flat.

In the second pattern forming method, the thick resist film 15 is bonded to each of a plurality of the slider bars 6, and the resist film 15 is pressed with the heated plate 16. The resist film 15 can penetrate each interval 11 between the slider bars by being heated and pressed. Furthermore, the resist film 15, which has a prescribed thickness and the surface of which has been made flat can be formed.

In addition, in the third pattern forming method, the thin film element forming layer 19 is formed on the disc-shaped ceramic material 18 and further the protective resist layer 20 is formed on the thin film element forming layer 19. Thereafter, the ceramic material 18 is sliced to thereby form the slider bars 21.

When a plurality of the slider bars 21 are fixed on the jig 9, the intervals 22 between the slider bars 21 are made as narrow as possible. The surface of the resist film 23 bonded to the surface of each slider bar 21 can be thereby easily made flat.

As described above, according to the present invention, each interval 11 (or 22) between the slider bars 6 (or 21) can be filled with the resist in any of the above methods, and further the surface of the resist film on each slider bar 6 (or 21) is made flat.

As a result, the etching pattern of each ABS plane can be formed on the surface of the resist with a good dimensional accuracy.

Since the resist between the slider bars is not removed in the development processing for forming the etching pattern, the sides of the slide bars are not etched by the dry etching. The redeposition of the etched powder and the damage of the thin film elements 7 can be thereby prevented.

According to the present invention described above in detail, in the pattern forming methods for forming the etching pattern of each ABS plane on the surface of a slider bar which opposes a recording medium, the intervals between a plurality of the slider bars fixed on the jig are filled with the resist film or the resist solution. Further, the surface of the resist film on the slider bars is made flat.

Accordingly, in the present invention, the etching pattern of each ABS plane can be formed on the surface of the resist film on each slider bar with a good dimensional accuracy.

Since the resist, with which each interval between the slider bars is filled, is not removed in the development processing when the etching pattern is formed, the sides of the slider bars are protected by the resist when the dry etching is carried out.

As a result, the sides of the slider bars are not etched by the dry etching. The redeposition of etched powder on the sides of the slider bars and the damage of the thin film elements can be thereby prevented.

What is claimed is:

1. A method of forming a slider for a magnetic head, comprising:

the step of disposing a plurality of slider bars side by side on a jig with intervals spaced therebetween, each slider bar having a plurality of elements on a side thereof;

the step of bonding a first resist film to the surface of each slider bar and filling each interval between the slider bars with the first resist film by heating and melting the first resist film;

the step of removing the first resist film on each slider bar with a developer in such a manner as to cause the first resist film filling each interval between the slider bars to remain;

the step of bonding a second resist film to the surface of each slider bar;

the step of exposing and developing the surface of the second resist film and forming etching patterns of an air-bearing surface on the second resist film; and the step of applying dry etching to the surface of each slider bar using the etching patterns;

wherein the step of bonding the first resist film is carried out at a first temperature and the step of bonding the second resist film is carried out at a second temperature, said second temperature being lower than said first temperature.

2. The method of forming a slider for a magnetic head according to claim 1, wherein said second resist film is cured by being irradiated with ultraviolet rays after the second resist film is bonded to the surface of each slider bar and before the second resist film is exposed and developed.

3. The method of forming a slider for a magnetic head according to claim 1, wherein the elements are any one of an anisotropic magnetoresistive effect head or an inductive head.

4. The method of forming a slider for a magnetic head according to claim 1, wherein as a result of the step of removing the first resist film, the respective surfaces of the plurality slider bars are flush with the surface of the first resist film remaining in the intervals between the slider bars.

* * * * *